W. R. EDWARDS.
TUBE WELDING MACHINE.
APPLICATION FILED APR. 30, 1918. RENEWED MAR. 5, 1920.

1,356,054.

Patented Oct. 19, 1920.
8 SHEETS—SHEET 2.

Fig. 4

W. R. EDWARDS.
TUBE WELDING MACHINE.
APPLICATION FILED APR. 30, 1918. RENEWED MAR. 5, 1920.

1,356,054.

Patented Oct. 19, 1920.
8 SHEETS—SHEET 7.

Inventor
William R. Edwards
by
Alexander R. Alexander
attorney

UNITED STATES PATENT OFFICE.

WILLIAM R. EDWARDS, OF CLEVELAND, OHIO, ASSIGNOR TO THE CLEVELAND WELDING AND MANUFACTURING COMPANY, OF CLEVELAND, OHIO, A CORPORATION OF OHIO.

TUBE-WELDING MACHINE.

1,356,054.  Specification of Letters Patent.  Patented Oct. 19, 1920.

Application filed April 30, 1918, Serial No. 231,705. Renewed March 5, 1920. Serial No. 363,594.

*To all whom it may concern:*

Be it known that I, WILLIAM R. EDWARDS, a citizen of the United States, residing at Cleveland, in the county of Cuyahoga and State of Ohio, have invented certain new and useful Improvements in and Relating to Tube-Welding Machines, of which the following is a specification.

This invention relates to apparatus for welding tubes, particularly apparatus of the autogenous type.

One object of the invention is to provide a construction of relatively simple form adapted to weld the seam edges of a tube or tubes.

Another object of the invention is to provide an improved apparatus adapted to weld tubes of different shapes.

Another object of the invention is to provide improved means for guiding and supporting the tube or tubes in operative relationship to the flame of the torch, whereby the edges of the tube or tubes are properly welded without burning of the metal.

Another object of the invention is to provide improved means for automatically welding a plurality of tubes one after another.

These and other objects of the invention will be apparent to those skilled in the art to which my invention relates from the description taken in connection with the accompanying drawings.

For the purpose of illustration I have in the accompanying drawings shown and herein described one form of apparatus embodying my invention.

In the drawings, 1 indicates as an entirety a support or frame preferably comprising a bed $1^a$ having legs $1^b$ and a plate $1^c$. At its opposite ends, the bed $1^a$ may be provided with side walls $1^d$ which are preferably formed integral with the bed $1^a$ and plate $1^c$. The bed $1^a$ may be secured to the legs $1^b$ in any well known manner.

2 indicates a pair of brackets, each secured in any preferred way to the adjacent side wall $1^d$. The brackets 2 are formed with bearings for shafts 3, $3^a$. Each of the shafts 3, $3^a$, carries a wheel 4 which supports and guides a propelling device 5. The propelling or feed device preferably comprises an endless chain extending around the wheels 4 and a plurality of projecting members $5^a$ uniformly spaced along the chain 5. Each member $5^a$ may be provided with a hooked end or ends to engage the rear end of a tube A, which is to be welded, to propel or feed it relative to the flame of the torch, indicated as an entirety at 6.

The torch 6 may be of any preferred type, that shown being adapted to burn acetylene and oxygen gases, supplied through pipes 6ª. These gases are suitably mixed and discharged through a tip 6ᵇ, which projects the flame onto the tube as will be later set forth.

7 indicates a holder or supply chamber adapted to receive a plurality of tubes A. The holder 7 is preferably shaped to hold a plurality of tubes in superposed or stacked relationship, whereby they may be removed from the bottom of the stack one by one and fed to or below the torch 6, and additional tubes placed on top of the stack to keep the stack substantially full. The holder 7 may comprise a bottom or supporting member 7ª on which the stack of tubes A rests, and pairs of spaced uprights 7ᵇ between which the tubes are placed. The bottom 7ª is preferably of the same width as each tube A and the uprights 7ᵇ are bolted to opposite sides of the bottom, as shown in Figs. 1, 2, 3 and 9. The bottom 7ª is disposed horizontally and in the plane of the upper run of the propelling chain 5, it being cut away, as indicated at 7ª′, sufficiently to receive the chain but cause the engaging members 5ª thereof to project above the surface of the bottom and thus move into engagement with the rear end of the lowermost tube (see Fig. 1). The holder 7 may be secured to the support 1 in any desired manner, but preferably by bolts 7ᶜ, extending through openings in the plate 1ᶜ. Certain of the bolts 7ᶜ also may serve to secure the uprights 7ᵇ to the bottom 7ª, as already described. Between the holder 7 and plate 1ᶜ I preferably provide a spacing member 8, to support the holder in alinement with the torch 6 and direction of movement of the chain 5. 9 indicates a plate secured to the front edges of the front pair of uprights 7ᵇ and forming the front wall of the holder. As clearly shown in Figs. 1 and 9, the lower end of the plate 9 is elevated above the bottom 7ª a distance slightly greater than the diameter, in a vertical direction, of each tube A, and forms with the bottom a delivery opening for the holder, to permit but one tube A—the lowermost tube—at a time to be moved or fed forwardly by each engaging member 5ª.

10 indicates pairs of upper and lower rollers arranged in front and rear of the torch 6 and coöperating to guide each tube relative thereto. The rollers may be loosely mounted on their respective shafts, as hereinafter described. The upper roller 10ª of each pair preferably has a flat circumferential surface and its shaft 10ᵇ is fixed to and supported in any well known manner by the plate 1ᶜ, or an integral part thereof. The lower roller 11 of each pair of rollers 10 is provided with flanges 11ª and inclined walls 11ᵇ conforming substantially to the shape of the tube A to engage and properly guide it, and is also grooved, as shown at 11ᶜ, to receive the chain 5 as it feeds the tube forward. The shaft 11ᵈ for each roller 11 is mounted at its inner end to the outer end of a swingable arm 12, whereby the roller may be swung vertically to press the tube against the upper roller 10ª. The arm 12 is connected to one end of a shaft 12ª, which extends through a bearing 1ᶜ′ and the plate 1ᶜ. At its opposite end the shaft 12ª carries an arm 13 from the free end of which is suspended a weight 14. The weight tends to rotate the shaft 12ª and it in turn tends to swing the arm 12 upwardly, whereby the roller 11 will be pressed against each tube A. The hub 13ª of the arm 13 is preferably adjustably connected to the shaft 12ª by a set screw 13ᵇ. The arm 12 and hub 13ª preferably engage the opposite ends of the bearing 1ᶜ′, to prevent endwise movement of the shaft 12ª. The hub 13ª may be held in place on the shaft 12ª by a nut 13ᶜ.

Figure 7:
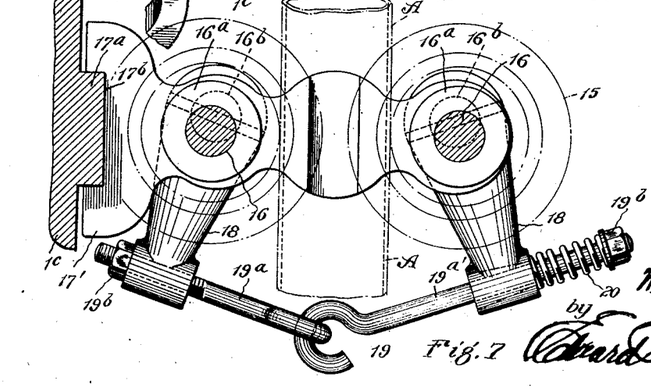
Fig. 7 is a section on the line 7—7 of Fig. 6.
Figure 12:
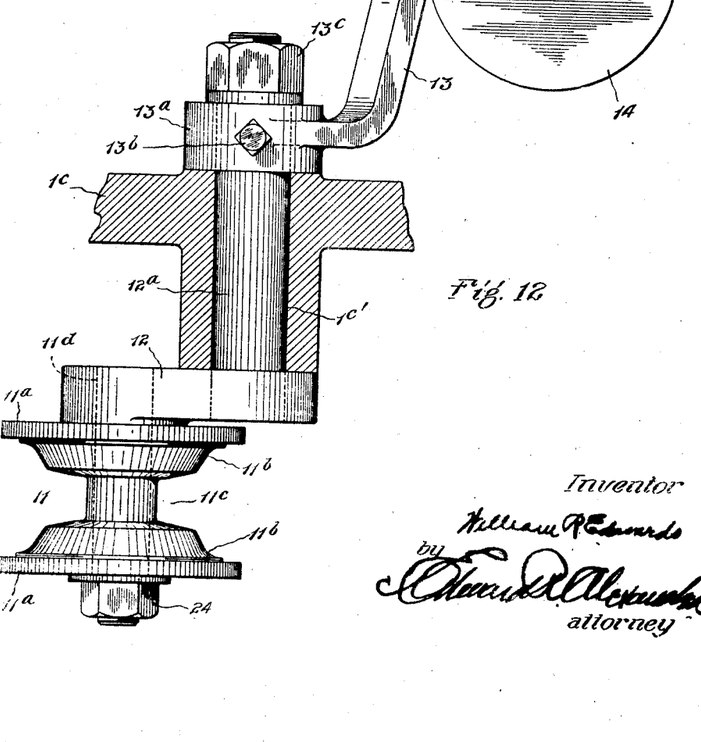
Fig. 12 is a section on the line 12—12 of Fig. 4.
Figures 13, 14:
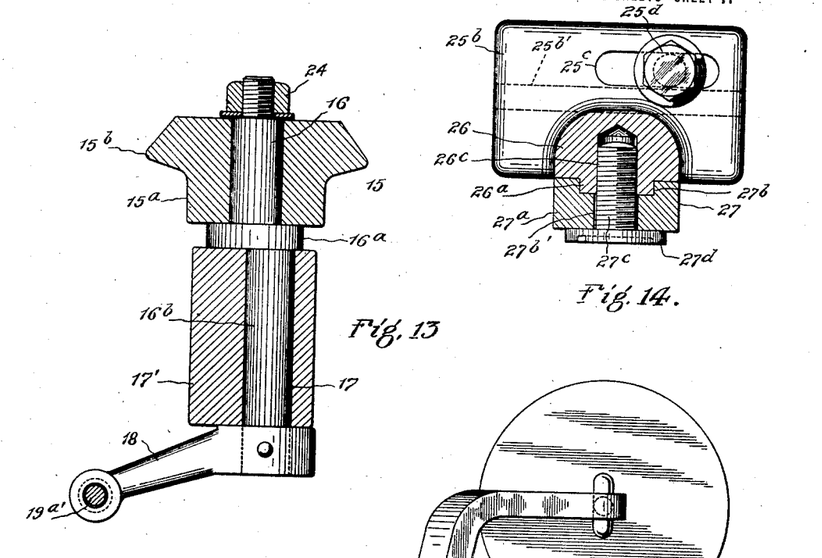
Fig. 13 is a section on the line 13—13 of Fig. 5.
Fig. 14 is a section on the line 14—14 of Fig. 4.
Figures 15, 16, 18, 19, 20, 21, 22:
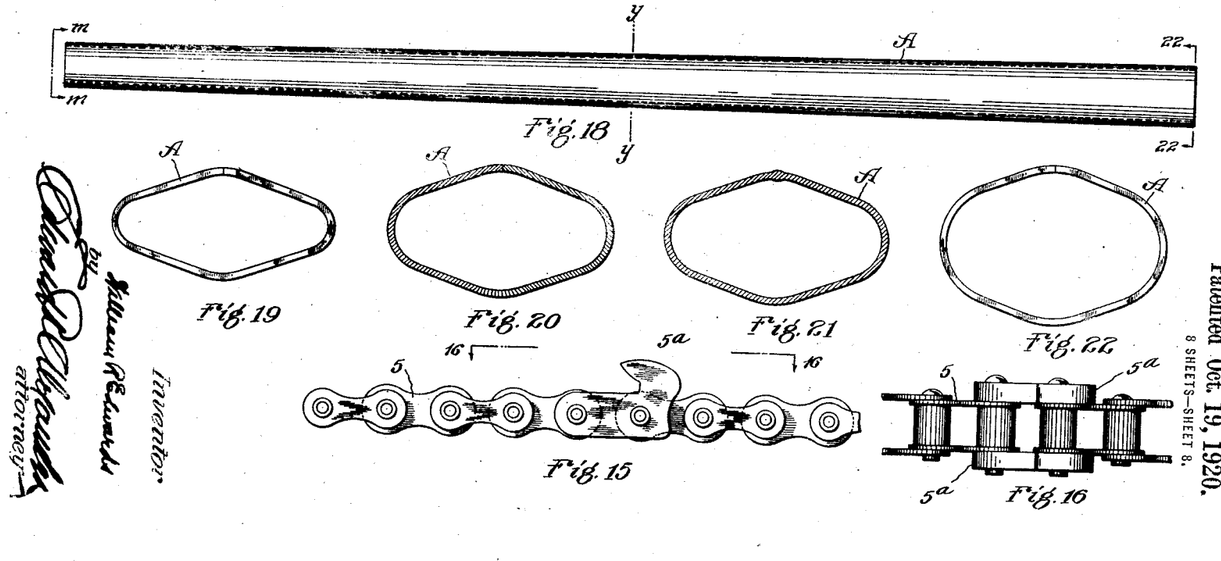
Fig. 15 is a fragmentary view of the tube propeller device.
Fig. 16 is a fragmentary top plan view of the propelling device looking in the direction of the arrows 16, 16.
Fig. 18 is a side elevation of the tube.
Fig. 19 is an end view of the tube looking in the direction of the arrows $m$, $m$.
Fig. 20 is a section on the line $y$—$y$, of Fig. 18, before welding of the seam edges has taken place.
Fig. 21 is a section on the line $y$—$y$ of Fig. 18 after the welding operation has taken place.
Fig. 22 is an end view of the tube looking in the direction of the arrows 22, 22.
Figure 17:
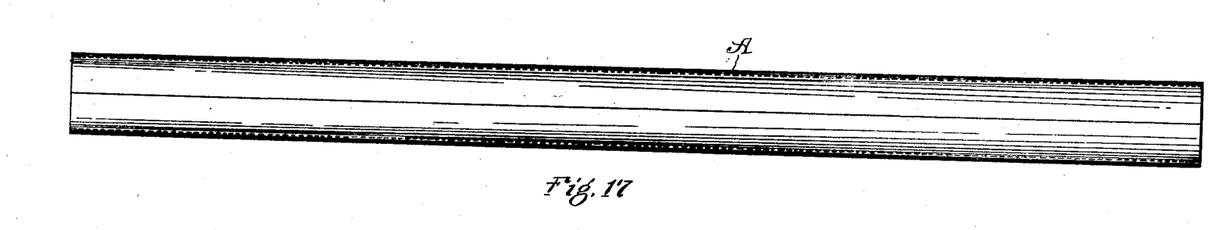
Fig. 17 is a top plan view of a tube which may be welded on an apparatus embodying my invention.

15 indicates a pair of movable rolls adapted to engage the opposite sides of each tube. The functions of the rolls 15 are to guide the tubes relative to the torch 6, and to impart pressure to the opposite sides of the tube walls, to press their seam edges together, whereby a proper weld thereof may be effected. The roller is also preferably shaped to engage the upper portions of the tube walls to insure contact of the seam edges immediately after the torch flame has heated the metal of the tube. To more readily carry out these latter functions, the rolls 15 are arranged upon opposite sides of and preferably slightly rearwardly of the torch tip 6ᵇ, and yieldingly pressed toward each other, as hereinafter described. Each roll 15 is provided with a flat wall 15ª which engages the side of the tube and an inclined wall or flange 15ᵇ, which is shaped to engage the upper portion of the tube wall at one side of the seam thereof. These walls are preferably so arranged and correlated that they will engage the adjacent tube side wall and adjacent upper portion of the tube throughout its length from end to end so that uniform pressure and contact will occur along the seam from end to end thereof. Each roll 15 is loosely mounted on a stub shaft 16, preferably connected to a disk 16ª, which in turn is eccentrically connected to and rotated by a shaft 16ᵇ. The shafts 16ᵇ are mounted in bearings 17 formed in a bracket 17′, which is connected with the plate 1ᶜ. Each stub shaft 16, disk 16ª and shaft 16ᵇ is preferably formed integrally, the shaft 16 being arranged eccentric to the shaft 16ᵇ, so that upon the rotation of the latter, the stub shaft 16 will be swung toward and from the tube A, accordingly as the shaft $16^b$ is rotated in one direction or the other. The disk $16^a$ preferably serves as a spacer between the bracket $17'$ and roll 15 and its opposite surfaces may be finished to reduce friction between it and the roll 15 and the upper walls of the bracket $17'$. Each shaft $16^b$ preferably extends through the adjacent bearing 17 and carries at its lower end a crank or arm 18. 19 indicates the devices which tend to move the rolls 15 toward each other, whereby they cause pressure upon the walls of the tube A. The devices 19 are preferably connected to the cranks 18 and operate through them to rotate the shafts $16^b$. Of these devices, $19^a$, $19^{a'}$, indicates a pair of rods pivotally and detachably connected together at their inner ends. The outer ends of the rods $19^a$, $19^{a'}$, extend through openings formed in the outer enlarged ends of the cranks 18, the rod $19^a$ being preferably adjustably connected with the adjacent crank by means of screw threads and the other rod $19^{a'}$ having sliding and pivotal connection with the other crank 18. At its outer free end, the rod $19^{a'}$ is provided with screw threads to receive a nut $19^b$, which serves as an abutment. 20 indicates a spring preferably interposed between the abutment $19^b$ and the adjacent crank 18. The spring 20 may be coiled around the rod and in order that it may be of proper size and tension, the rod $19^{a'}$ is made somewhat longer than the rod $19^a$. As the spring is arranged between one crank 18 and the rod $19^{a'}$ or the abutment $19^b$ thereon, it tends to move both cranks 18 toward each other, and they in turn, operating through the shafts $16^b$ and eccentrics 16, as already described, tend to press the rolls 15 against tubes A as the latter are fed endwise through the guide rollers $10^a$, 11, relative to the torch 6. As shown in Fig. 7, the outer ends of the cranks 18 are disposed equal distances from the longitudinal axis of the tube A, so that they may move the same distance under the influence of the spring and apply equal pressures upon the opposite sides of the tube. By rotating the nut $19^b$, the length of the rod $19^{a'}$ and the tension of the spring 20 can be adjusted so as to properly position the cranks 18 and cause the rolls 15 to engage the tube walls with the desired degree of pressure.

From the foregoing description it will be seen that the rolls 15 press against the opposite sides of the tube for the purpose of forcing together or causing proper contact between the seam edges following the heating of the metal by the torch flame; it will also be seen that the lower rollers 11 acting upwardly against the tube press the upper portions thereof against the flanges of the rolls 15 and they in turn co-act with each other and with the body portions of the rolls 15 to press the seam edges together; furthermore, as the surfaces of the rollers $10^a$ are flat and engage the uppermost portion of the tube, or rather the opposite edges of the seam, (because I prefer to weld in my apparatus butt-seamed tubes, the seams of which are disposed in the vertical plane of the longitudinal axis of the tube) they also tend to press the edges of the seam together, in resisting the upward pressure of the rollers 11 due to the weights 14. It will therefore be seen that the guide rollers $10^a$, 11, and rolls 15 co-act to cause the proper contact between the edges of the seam in order that an effective weld may be carried out. The rear roller $10^a$ serves to compress the weld bur, thus making the metal constituting the bur more dense and reducing the amount of material which has to be ground off of the tube to finish it. As the roller $10^a$ is arranged in close proximity to the torch 6, it admirably accomplishes this result since the tube acquires a relatively high temperature from the torch flame and is still highly heated as it passes the rear roller $10^a$.

I preferably adjustably connect the bracket $17'$ to the plate $1^c$ whereby the rolls 15 may be raised and lowered to adapt them for engagement with tubes of varying shapes and sizes. For this purpose I provide the plate $1^c$ with a guide wall $17^a$ and form in the inner end of the bracket $17'$ a groove $17^b$ which receives the guide wall $17^a$. $17^c$ indicates an elongated slot formed in the plate $1^c$ and wall $17^a$. $17^d$ indicates a bolt which extends through the slot $17^c$ and into a screw threaded opening $17^e$ formed in the bracket $17'$. The bolt $17^d$ serves to clamp the bracket $17'$ to the plate $1^c$, but by loosening it, the bracket may be raised or lowered as desired. By this construction, it will be seen that both rolls 15 may be adjusted simultaneously.

The rolls 15 are preferably so positioned that their flanges will co-act with the rollers $10^a$ to maintain the tube in the plane of their peripheries. By this arrangement the rolls 15 operate to guide and maintain the front end of each tube before it reaches the rear roller $10^a$ and the rear end of each tube after it passes the front roller $10^a$ in the plane of the peripheries of these rollers. It will therefore be seen that the front and rear ends of the tubes as well as their intermediate portions will be maintained at the proper distance from the torch tip $6^b$.

21 indicates a member which receives the tubes A from the chain 5 after they have been welded. The receiving member 21 may comprise an inclined plate secured, preferably by angle plates $21^a$, to some part of the frame 1.

22 indicates a member arranged in the path of movement of the tubes A and adapted to discharge them from the chain 5 onto the receiver 21. The discharge member preferably comprises a plate bolted to some part of the frame 1, such as the plate 1ᶜ, and having a laterally curved outer end 22ᵃ. The curved end 22ᵃ is engaged by the front end of each tube and causes the latter to fall or roll off of the chain 5 onto the receiver 21. The curved end 22ᵃ is arranged to be engaged by each tube just as or immediately after its rear end emerges from between the rear guide rollers 10.

The chain 5 may be operated by any suitable means, that shown preferably comprising a shaft 23, mounted in bearings carried by the frame 1, a pulley 23ᵃ fixed to the shaft 23, a worm 23ᵇ fixed to the shaft 23, and a worm gear fixed to the shaft 3ᵃ and meshing with the worm 23ᵇ. As shown, the rollers 10ᵃ and 11 and the rolls 15 are held in position on their respective shafts by nuts 24, which permit them to be removed at will.

My apparatus is adapted to weld tubes of various shapes in cross section and sizes, as well as tubes which taper from end to end. In this connection it will be noted that the shafts 10ᵇ for the rollers 10ᵃ are fixed, so as to maintain, support and guide the upper surface of the tube—that is, that portion of the tube in which the seam extends—in a horizontal plane which is fixed; whereas, the shafts 11ᵈ are independently movable about the axes of the shafts 12ᵃ and thus permit the rollers 11 to accommodate themselves to cylindrical tubes or tapered tubes, such as I have shown for illustrative purposes in the drawings, see Figs. 17 to 22, inclusive. Although the tube A, which is shown in the drawings, is but slightly tapered from end to end, its upper and lower walls have a relatively large taper from end to end. Notwithstanding the difference in height between the front and rear ends of the tube, the rollers 11 readily accommodate themselves to and always maintain the tube against the rollers 10ᵃ under the action of the weights 14; furthermore, when the rear end of a tube, such as I have shown, passes each roller 11, the latter will immediately swing upwardly into engagement with the front end of the succeeding tube and thus insure the proper positioning of the tube against or in engagement with the rollers 10ᵃ and the flanges of the rolls 15 and its feeding past the torch 6. I am enabled therefore to feed the tubes one behind the other with their adjoining ends relatively close together.

By removing the guiding and supporting elements 10ᵃ, 11 and 15, and substituting other elements therefor, the machine can readily be adapted to tubes of many different sizes and shapes.

The torch 6 is preferably supported by means, indicated as an entirety at 25, which permit it to be rotated, and moved endwise and also bodily vertically, as well as longitudinally of and transversely of the tube, whereby the flame ejected from the tip 6ᵇ may be properly controlled and regulated to contact with the tube in line with its seam and to heat it to the proper degree without danger of overheating or burning the metal. These adjustments are under the immediate control of the operator and can readily be made during the feeding of each tube A to the torch flame. Of these supporting means 25, 25ᵃ indicate a base extending laterally from the upper edge of the plate 1ᶜ and preferably formed integral therewith. 25ᵃ′ indicates a guide rib provided on the base 25ᵃ and extending endwise or longitudinally of the bed 1ᵃ and parallel to the direction of feed of the tubes A. 25ᵇ indicates a slide having a recess 25ᵇ′ adapted to receive and slidably engage the rib 25ᵃ′. The slide 25ᵇ is adapted to move or slide on the base 25ᵃ longitudinally of the bed 1ᵃ, being guided by the rib 25ᵃ′. 25ᶜ indicates an elongated slot formed in the horizontal slide 25ᵇ and 25ᵈ indicates a bolt extending through the slot 25ᶜ and engaging a screw threaded opening in the base 25ᵃ, whereby the slide 25ᵇ may be clamped in any adjusted position to the base 25ᵃ. 26 indicates a standard or upright member mounted on and preferably formed integral with the slide 25ᵇ. At 26ᵃ, the standard 26 is provided with a plate the opposite side walls of which serve as guide walls. 27 indicates an intermediate supporting element having a leg 27ᵃ. On its inner face, the leg 27ᵃ is provided with a groove 27ᵇ which slidably receives the plate 26ᵃ and is vertically guided by side walls thereof. 27ᵇ′ indicates an elongated opening formed in the leg 27ᵃ and 27ᶜ indicates a bolt or cap screw extending through the slot and into a screw threaded opening 26ᶜ formed in the standard 26. The head of the screw 27ᵈ may be relatively large, whereby it may form an outer guide wall coöperating with the face of the standard 26 and plate 26ᵃ to slidably support the leg 27ᵃ of the intermediate supporting element 27. 28 indicates a shaft or rod rotatably mounted in and extending through an opening 28ᵃ formed in the supporting element 27. At its lower or free end, the rod 28 is screw threaded and fits a screw threaded opening 26′ formed in the standard 26. 28ᵇ indicates a pair of spaced collars adjustably fixed to the rod 28, preferably by set pins 28ᶜ. The collars 28ᵇ engage the upper and lower walls of the supporting element 27 to raise or lower it upon the rotation of the rod 28, such movement of the supporting element 27 being guided by the walls 27ᵃ, plate 26ᵃ and head of the cap screw 27ᵈ. 28ᵈ indicates a device, such as a wheel, by which the rod 28 may be operated.

While the screw 27ᵈ may be operated to rigidly clamp the leg 27ᵃ to the standard 26, I prefer to so adjust it that the supporting element 27 readily may be raised and lowered by turning the hand wheel 28ᵈ.

29 indicates an opening formed in or extending horizontally through the supporting element 27 and adapted to slidably receive a rod 30. 30ᵃ, 30ᵃ, indicates a pair of members adapted to clamp between them the body member of the torch 6. The inner clamping member 30ᵃ is fixedly connected to the outer end of the slide rod 30 in any well known manner, while the outer clamping member 30ᵃ may be connected to the inner member by a plurality of bolts 31, the adjustment of which serves to clamp the torch between the members 30ᵃ. By proper adjustment of the bolts 31, the torch 6 can be made sufficiently rigid for all purposes and at the same time permit the operative to rotate it to adjust the torch tip 6ᵇ if desired. The devices for moving or adjusting the slide rod 30 in the opening 29, whereby the torch may be adjusted transversely of a tube A, preferably consist of an arm 32 rigidly connected at one end in any well known way, to the rod 30 and carrying or engaging at its opposite end a shaft 32ᵃ. At its inner or free end the shaft 32ᵃ has a screw thread connection with an opening 33, whereby the shaft may be adjusted in an endwise direction. 32ᵇ indicates a pair of collars fixed to the shaft 32ᵃ and engaging the opposite sides of the arm 32, so as to move the latter toward and from the supporting element 27 whenever the shaft 32ᵃ is rotated. 32ᶜ indicates a suitable device, such as a hand wheel, secured to the outer end of the shaft 32ᵃ for operating it. As the arm 32 is rigidly connected to the rod 30, it will be seen that the adjustment of the shaft 32ᵃ will move the rod 30 endwise and it in turn will adjust the torch to any desired extent.

Figure 1:
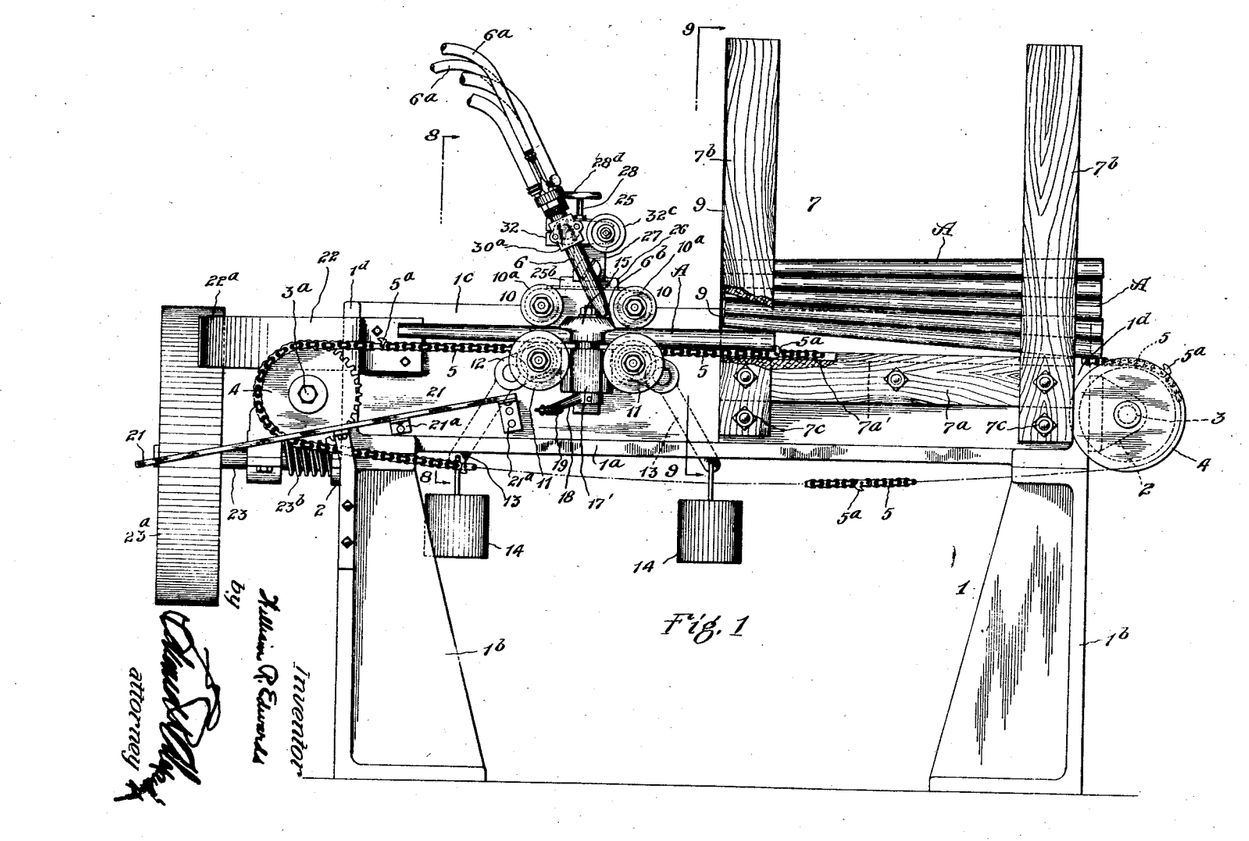
Figure 1 is a side elevation of an apparatus embodying my invention.
Figure 2:
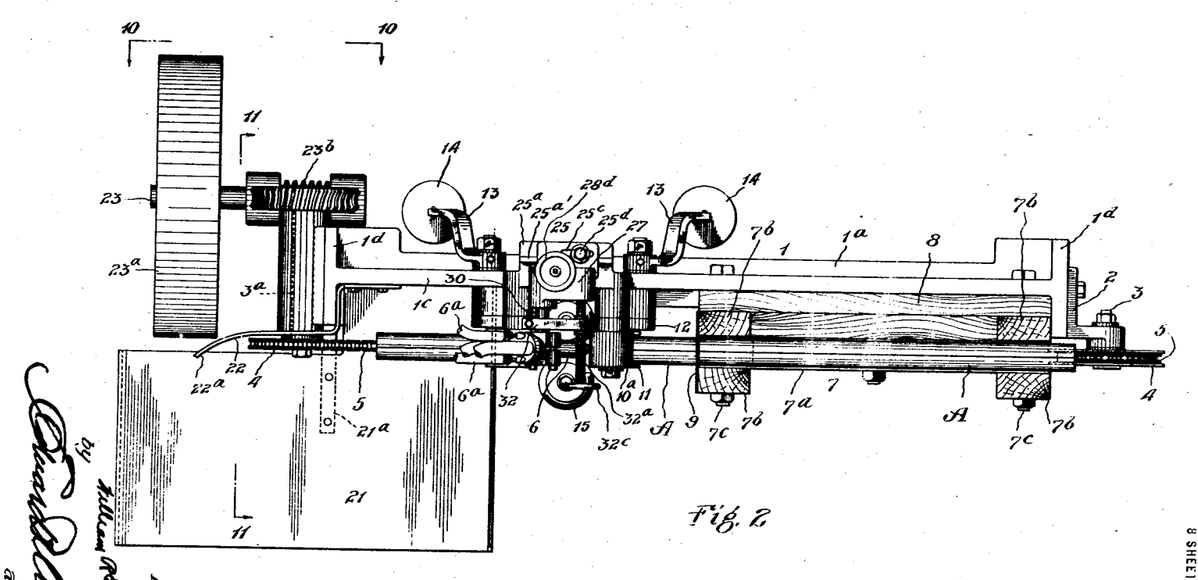
Fig. 2 is a top plan view thereof.
Figures 3, 8, 9, 10, 11:
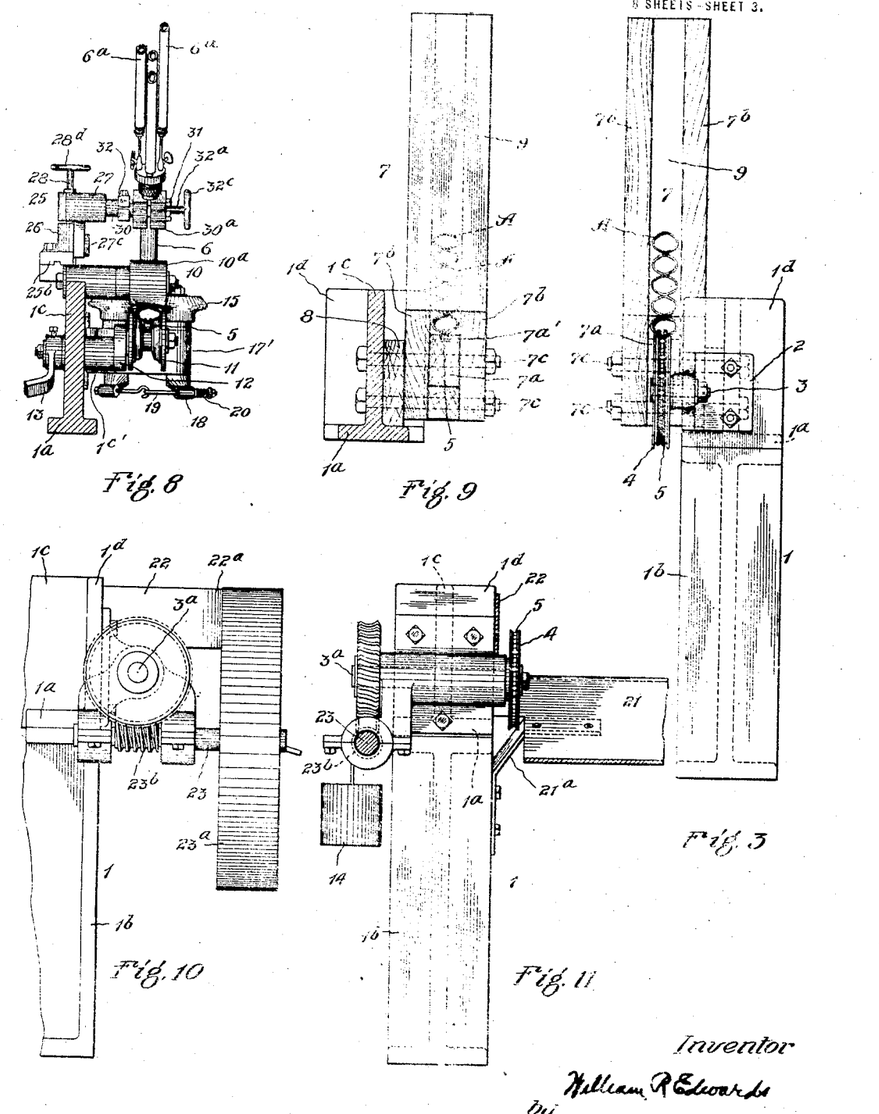
Fig. 3 is a rear end view looking toward the left of Fig. 1.
Fig. 8 is a section on the line 8—8 of Fig. 1.
Fig. 9 is a section on the line 9—9 of Fig. 1.
Fig. 10 is a fragmentary view of the machine between and looking in the direction of the arrows 10, 10 of Fig. 2.
Fig. 11 is a section on the line 11—11 of Fig. 2.
Figure 4:
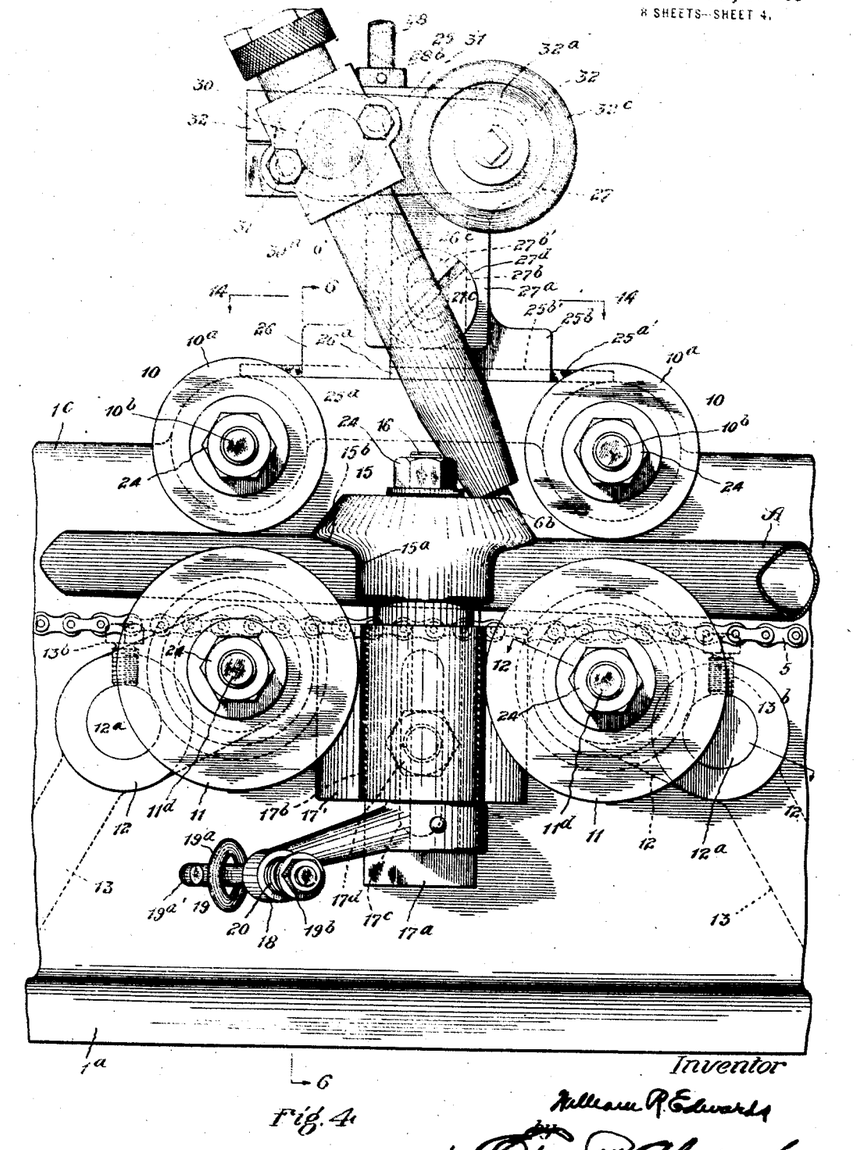
Fig. 4 is a fragmentary elevation, enlarged.
Figure 5:
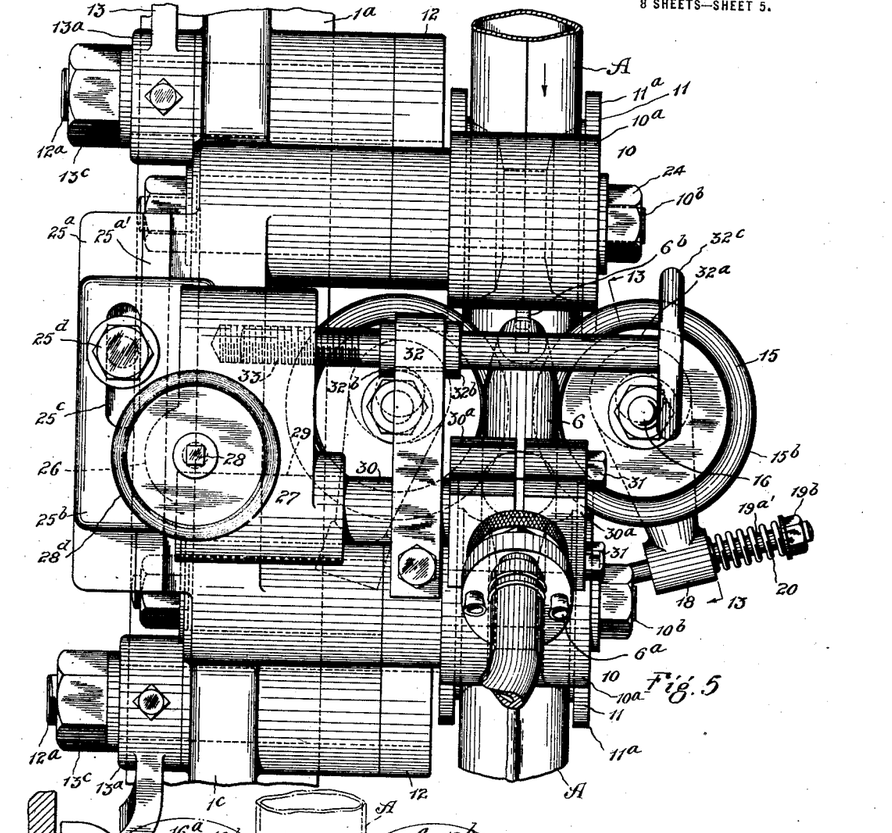
Fig. 5 is a top plan view of the parts shown in Fig. 4.
Figure 6:
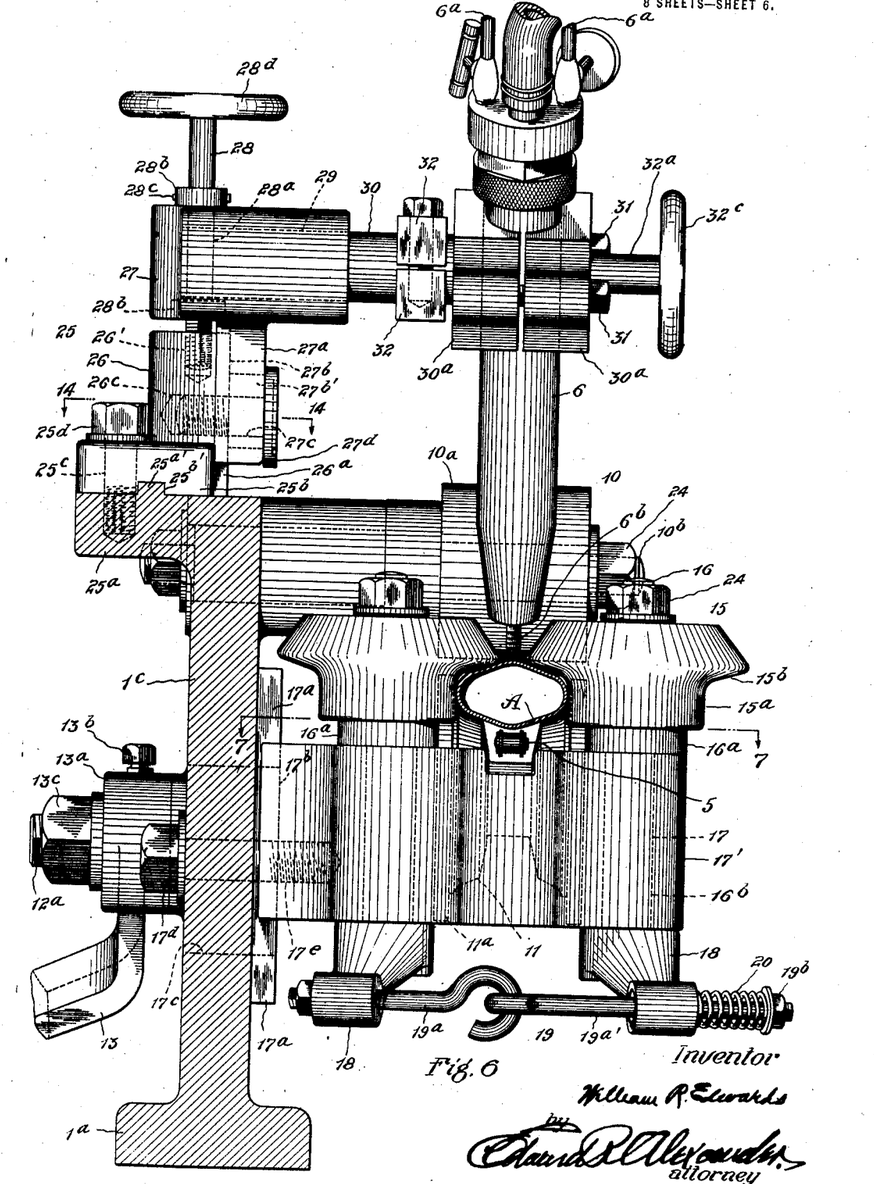
Fig. 6 is a section on the line 6—6 of Fig. 4.

From the foregoing description it will be seen that I provide in front and rear of the torch 6 a pair of fixed rollers 10ᵃ which serve as a fixed guide or abutment against which the upper wall or walls of each tube A are maintained during its endwise movement. Furthermore, the elements 11, which maintain each tube A against the fixed rollers 10ᵃ are arranged therebelow and are movable in the vertical plane thereof. Accordingly, the movable guide elements 11 not only yieldingly press the tube upwardly, but at the same time accommodate themselves to any variations in the size or shape of the tube. As a result of this construction, the wall or walls of each tube constituting the seam edges are disposed and movable in a fixed horizontal plane relative to which the torch may be adjusted, and this enables the operative at all times to control or adjust the torch 6 to effect proper heating of the tube metal. The advantages of this construction are well illustrated in the drawings wherein I have shown the welding of tapered tubes. Referring to Fig. 1, it will be noted that the upper wall of the tube is maintained against and in the plane of the peripheries of the rollers 10ᵃ whereas the rollers 11 accommodate themselves to the difference in the vertical diameter of the tube.

It will also be seen from the foregoing description that the rollers 11 engage each tube at opposite sides of the feeding element 5 and thus act to press or move the tube bodily upwardly, without any tendency to twist or distort it, at the same time permitting the feeding element at all times to act on the tube. Furthermore, it will be noted that the feeding element 5 comprises a chain which is flexible and unsupported below the guiding and positioning elements, and hence admirably lends itself for coöperation with the movable guide elements 11, since it will permit the unobstructed operation of the elements 11, at the same time continuously operate to progressively feed the tube forwardly. Each tube engaging member 5ᵃ engages the rear end only of a tube. This leaves the entire length or body of the tube unattached from the chain and free to be acted upon by the rollers 11.

The chain 5 is moved continuously so that the heating and welding of the tubes take place progressively. As the rear chain wheel 4 is arranged rearward of the hopper 7, the tube engaging members move into engagement with and automatically feed the lowermost tube forwardly, making it necessary for the operative to simply watch the torch 6.

As already described, the peripheries of the rolls 15 are shaped to engage the opposite ends of the tube and the upper portions of the tubes at opposite sides of the seam throughout their entire lengths. Although the tubes are tapered from end to end, I am enabled, as a result of this construction, to cause uniform pressure and contact between the edges of the seam from end to end of the tube and to thereby insure a proper welding of tapered tubes, as well as cylindrical tubes.

It will be noticed that by my construction I am enabled successively to feed and guide tapered tubes relative to the welding mechanism without the use of shoes or clamping members of any kind.

To those skilled in the art of making apparatus of the character described, many alterations in construction and widely differing embodiments and applications of my invention will suggest themselves without departing from the spirit and scope thereof as defined in the appended claims. My disclosures and description herein are purely illustrative, and are not intended to be in any sense limiting.

What I claim is:

1. In apparatus of the class described, the combination with a welding mechanism, of means for feeding tubes relative to said welding mechanism, a receiver arranged at one side of said feeding means and rearward of said welding mechanism, and means arranged in the path of movement of the tubes for discharging them from said feeding means onto said receiver.

2. In apparatus of the class described, the combination with a welding mechanism, of means for feeding tubes relative to said welding mechanism, a receiver arranged at one side of said feeding means and rearward of said welding mechanism, and a member extending at an angle to the direction of movement of said feeding means and arranged in the path of movement of the tubes for discharging them from said feeding means onto said receiver.

3. In apparatus of the class described, the combination with a welding mechanism, of means for feeding tubes thereto, a pair of rollers mounted in front of said welding mechanism and coöperating to guide the tubes relative thereto, one of said rollers being stationarily mounted and the other roller being mounted to swing relative to said stationary member, a second pair of rolls arranged at right angles to the first mentioned rolls and in juxtaposition to said welding mechanism, and means for moving said second rolls toward each other.

4. In apparatus of the class described, the combination with a welding device, of means for feeding tubes relative thereto, a pair of upper and lower rollers mounted in front of said welding device, a pair of rolls arranged at opposite sides of said welding device and provided around their upper edges with flanges to engage the upper portions of the tube wall at opposite sides of the seam therein, and means tending to move the lower roller upwardly to maintain the tube against the upper roller and the flanges of said rolls.

5. In apparatus of the class described, the combination with a welding device, of means for feeding tubes relative thereto, a pair of upper and lower rollers mounted in front of said welding device, a pair of rolls arranged at opposite sides of said welding device and provided around their upper edges with flanges to engage the upper portions of the tube wall at opposite sides of the seam therein, means tending to move the lower roller upwardly to maintain the tube against the upper roller and the flanges of said rolls, and means for yieldingly pressing said rolls against the opposite sides of the tube.

6. In apparatus of the class described, the combination with a welding mechanism, of means for feeding a tube relative to said welding mechanism, a pair of stationarily mounted rollers arranged in front and rear of said welding mechanism, and pairs of coöperating elements independently movable vertically and horizontally and yieldingly engaging the tube to maintain it against said rollers and simultaneously press the seam edges of the tubes together.

7. In apparatus of the class described, the combination with a welding mechanism, of means for feeding tubes relative to said welding mechanism, pairs of rollers arranged in front and rear of said welding mechanism for guiding and supporting the tubes relative thereto, and a pair of swingably mounted devices arranged intermediate of said rollers and coöperating with either pair of rollers to guide the ends of the tubes relative to said welding mechanism.

8. In apparatus of the class described, the combination with a welding mechanism, of means for feeding a tube relative to said welding mechanism, pairs of rollers arranged in front and rear of said welding mechanism for guiding and supporting the tube relative thereto, a pair of swingably mounted devices arranged intermediate of said rollers and at opposite sides of the tube and coöperating with either pair of rollers to guide the ends of the tube relative to said welding mechanism, and means yieldingly connecting said devices together to cause them to exert pressure upon the walls of the tube.

9. In apparatus of the class described, the combination with a welding mechanism, of rollers arranged in front and rear of said welding mechanism, coöperating elements movable vertically to maintain a tube against said rollers, and means for feeding the tube relative to said welding mechanism and permitting vertical movement of said tube during feeding thereof.

10. In apparatus of the class described, the combination with a welding mechanism, of rollers arranged in front and rear of said welding mechanism, coöperating elements movable vertically to maintain a tube against said rollers, and a chain for feeding the tube relative to said welding mechanism and permitting vertical movement of said tube during feeding thereof.

11. In apparatus of the class described, the combination with a welding mechanism, of upper and lower guide devices, the lower device being movable vertically, means tending to move said lower guide device upwardly whereby the tube is maintained against said upper device, a device on which the tube normally rests, means for engaging the rear end only of the tube to said device, and means for moving said device relative to said welding mechanism.

12. In apparatus of the class described, the combination with a welding mechanism, of upper and lower guide devices, the lower device being movable vertically, means tending to move said lower guide device upwardly whereby the tube is maintained against said upper device, a device on which the tube normally rests, said device being flexible in vertical directions, means for engaging the rear end only of the tube to said device, and means for moving said device relative to said welding mechanism.

13. In apparatus of the class described, the combination with a welding mechanism, of upper and lower guide devices, the lower device being movable vertically, means tending to move said lower guide device upwardly whereby the tube is maintained against said upper device, a chain on which the tube normally rests, means for engaging the rear end only of the tube to said chain, and means for moving said chain relative to said welding mechanism.

14. In apparatus of the class described, the combination with a welding mechanism, of a pair of upper and lower rollers, said lower roller being swingable vertically to press the tube against said upper roller and coöperate therewith to guide a tube relative to said welding mechanism, and a chain having a member for engaging the rear end of the tube to feed it relative to said welding mechanism, said lower roller being grooved to permit the chain to move between the tube and roller as it feeds the tube forwardly.

15. In apparatus of the class described, the combination with a welding mechanism, of pairs of upper and lower rollers arranged in front and rear of said welding mechanism, the upper rollers being of the same size and arranged in the same horizontal plane, and having flat peripheries, and the lower rollers having inclined walls engaging the opposite lower portions of a tube and swingable vertically to maintain the tube against said upper rollers, and means for feeding the tube between said upper and lower rollers relative to said welding mechanism.

16. In apparatus of the class described, the combination with a welding mechanism, of pairs of upper and lower rollers arranged in front and rear of said welding mechanism, the upper rollers being of the same size, and arranged in the same horizontal plane, and having flat peripheries, and the lower rollers having inclined walls engaging the opposite lower portions of a tube and swingable vertically to maintain the tube against said upper rollers, means for feeding the tube between said upper and lower rollers relative to said welding mechanism, and a pair of swingable rolls arranged between said pairs of rollers for pressing the seam edges of the tube together.

17. In apparatus of the class described, the combination with a welding mechanism, of pairs of upper and lower rollers arranged in front and rear of said welding mechanism, the upper rollers being of the same size, and arranged in the same horizontal plane, and having flat peripheries, and the lower rollers having inclined walls engaging the opposite lower portions of a tube and swingable vertically to maintain the tube against said upper rollers, means for feeding the tube between said upper and lower rollers relative to said welding mechanism, a pair of swingable rolls arranged between said pairs of rollers for pressing the seam edges of the tube together, and spring connections between said rolls.

18. In apparatus of the class described, the combination with a welding mechanism, of pairs of upper and lower rollers arranged in front and rear of said welding mechanism, the upper rollers being of the same size, and arranged in the same horizontal plane, and having flat peripheries, and the lower rollers having inclined walls engaging the opposite lower portions of a tube and swingable vertically to maintain the tube against said upper rollers, means for feeding the tube between said upper and lower rollers relative to said welding mechanism, a pair of swingable rolls arranged between said pairs of rollers for pressing the seam edges of the tube together, spring connections between said rolls, and means for adjusting said spring connections.

19. In apparatus of the class described, the combination with a mechanism for welding a tapered tube, a pair of upper and lower rollers for guiding the tube relative to said welding mechanism, means for yieldingly pressing said lower roller against the tube, a pair of rolls arranged at opposite sides of said tube, the periphery of each roll being shaped to engage the upper portion of the tube at one side of the seam throughout the length of the tube and also engage the side of the tube throughout its length, and means for moving the rolls toward each other.

20. In apparatus of the class described, the combination of a welding mechanism, a hopper adapted to receive and support a plurality of tubes in stacked relationship, an endless chain, the upper run of which moves below said hopper and said welding mechanism, devices uniformly spaced along said chain and arranged to automatically engage and feed successively the lowermost tube from said hopper, and a pair of upper and lower guide members between which each tube moves, one of said members being swingable vertically and arranged to guide and control the position of the tube while being moved forward by said chain.

21. In apparatus of the class described, the combination of a welding mechanism, a hopper adapted to receive and support a plurality of tubes in stacked relationship, an endless chain, the upper run of which moves below said hopper and said welding mechanism, devices uniformly spaced along said chain and aranged to automatically engage and feed successively the lowermost tube from said hopper, the bottom of said hopper being grooved to receive the chain but permit said devices to project thereabove to successively engage the rear ends of the tubes, and a pair of upper and lower guide members between which each tube moves, one of said members being swingable vertically and arranged to guide and control the position of the tube while being moved forward by said chain.

In testimony whereof I affix my signature.

WILLIAM R. EDWARDS.

Witness:
   Geo. B. Pitts.